BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 24, 1968

857 O.G. 1037

T857,037

535,843

BOOK BACK RIBS

Ben T. Pardue and Edwin K. McClellan, both of P.O. Box 431, Kingsport, Tenn. 37662

Filed Mar. 21, 1966. Published Dec. 24, 1968

Class 161—123

1 Sheet Drawing. 13 Pages Specification

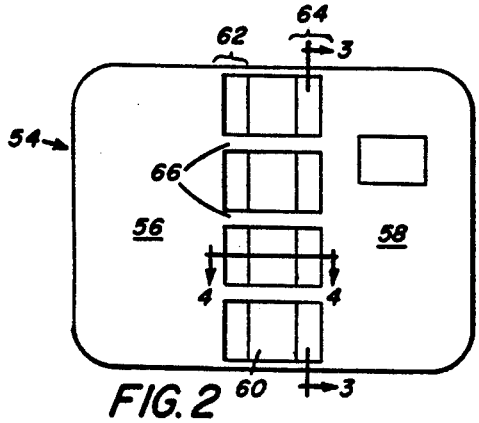

FIG. 2

A plastic article such as a book back having a thinned portion acting as an elongated hinge which is caused to be tear resistant by ribs extending thereacross. The ribs are thicker than the thinned hinge portion and the molecular orientation of the material of the ribs is across the hinge line. Thus, the ribs provide an area in the hinge which is resistant to tearing along the line thereof and which confines any tearing which does occur to only a small portion of the hinge.

United States Patent Office

PTO - BOYERS, PA Duty Station

MISSING PAGE TEMPORARY NOTICE

PATENT # T 857037 FOR ISSUE DATE 12-24-196

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Drawing Sheet 1

N/A at Boyers
6/1/94

Data Conversion Operation

Boyers, Pa